(12) United States Patent
Gaschler

(10) Patent No.: US 11,537,130 B2
(45) Date of Patent: Dec. 27, 2022

(54) ROBOT PLAN ONLINE ADJUSTMENT

(71) Applicant: X Development LLC, Mountain View, CA (US)

(72) Inventor: Andre Gaschler, Munich (DE)

(73) Assignee: INTRINSIC INNOVATION LLC, Mountain View, CA (US)

(*) Notice: Subject to any disclaimer, the term of this patent is extended or adjusted under 35 U.S.C. 154(b) by 170 days.

(21) Appl. No.: 16/728,650

(22) Filed: Dec. 27, 2019

(65) Prior Publication Data

US 2021/0200219 A1 Jul. 1, 2021

Related U.S. Application Data

(63) Continuation of application No. 16/727,024, filed on Dec. 26, 2019.

(51) Int. Cl.
*G05D 1/02* (2020.01)
*B25J 5/00* (2006.01)
*B25J 9/16* (2006.01)

(52) U.S. Cl.
CPC ............ *G05D 1/0212* (2013.01); *B25J 5/007* (2013.01); *B25J 9/1664* (2013.01); *B25J 9/1666* (2013.01); *B25J 9/1682* (2013.01); *B25J 9/1694* (2013.01); *G05D 1/027* (2013.01); *G05D 1/0274* (2013.01)

(58) Field of Classification Search
CPC combination set(s) only.
See application file for complete search history.

(56) References Cited

U.S. PATENT DOCUMENTS

| | | | | |
|---|---|---|---|---|
| 4,937,759 | A * | 6/1990 | Vold | G05B 19/4061 700/262 |
| 5,502,638 | A * | 3/1996 | Takenaka | G05D 1/0212 701/301 |
| 8,467,960 | B2 * | 6/2013 | Rinscheid | G01C 21/3415 701/417 |
| 8,892,255 | B2 | 11/2014 | Eberst | |
| 9,633,143 | B2 | 4/2017 | Carrasco | |
| 9,895,803 | B1 * | 2/2018 | Oslund | B25J 9/1666 |
| 10,035,266 | B1 * | 7/2018 | Kroeger | B25J 9/1664 |
| 10,946,519 | B1 | 3/2021 | Prats | |
| 2004/0193321 | A1 * | 9/2004 | Anfindsen | G05B 19/425 700/264 |

(Continued)

*Primary Examiner* — Jeff A Burke
*Assistant Examiner* — Madison B Emmett
(74) *Attorney, Agent, or Firm* — Fish & Richardson P.C.

(57) ABSTRACT

Methods, systems, and apparatus, including computer programs encoded on computer storage media, for performing robot plan online adjustment. A method includes receiving an initial plan for performing a particular task with a robot having a sensor. The initial plan defines an initial path having a plurality of waypoints. Each waypoint is associated with a target position and a target velocity. The method includes generating an alternative path from the initial path. Generating an alternative path includes generating a plurality of alternative paths including performing respective modifications to one or more waypoints in the initial plan, evaluating each alternative path according to a simulated total time duration required for the robot to traverse the alternative path, and selecting an alternative path having a total time duration that is less than a total time duration of the initial plan.

18 Claims, 5 Drawing Sheets

(56) References Cited

U.S. PATENT DOCUMENTS

| | | | |
|---|---|---|---|
| 2012/0158299 A1* | 6/2012 | Cerecke | G01C 21/3469 |
| | | | 701/533 |
| 2015/0039122 A1 | 2/2015 | Barakchi Fard | |
| 2015/0190926 A1* | 7/2015 | Miegel | G06F 30/00 |
| | | | 700/248 |
| 2015/0277398 A1* | 10/2015 | Madvil | G05B 13/04 |
| | | | 700/97 |
| 2017/0028556 A1* | 2/2017 | Summer | B25J 9/1664 |
| 2017/0057087 A1* | 3/2017 | Lee | G05D 1/0217 |
| 2017/0203446 A1* | 7/2017 | Dooley | H04N 5/23206 |
| 2017/0241790 A1 | 8/2017 | Yoshikawa | |
| 2017/0364076 A1 | 12/2017 | Keshmiri et al. | |
| 2019/0176333 A1* | 6/2019 | Hager, IV | G05D 1/0219 |
| 2019/0184561 A1* | 6/2019 | Yip | G06N 5/046 |
| 2019/0217857 A1* | 7/2019 | Sorin | B60W 60/0016 |
| 2019/0219409 A1 | 7/2019 | Tan et al. | |
| 2019/0314989 A1* | 10/2019 | Sokabe | B25J 9/163 |
| 2020/0026296 A1* | 1/2020 | Hoedt | B60W 20/11 |
| 2020/0030975 A1* | 1/2020 | Dinius | B25J 9/1664 |
| 2020/0047343 A1 | 2/2020 | Bal | |
| 2020/0056895 A1* | 2/2020 | Nagy | G05D 1/0088 |
| 2020/0097014 A1* | 3/2020 | Wang | G05D 1/0891 |
| 2020/0139545 A1* | 5/2020 | Hayashi | B25J 9/1664 |
| 2020/0174483 A1* | 6/2020 | Cheon | G05D 1/0238 |
| 2020/0174490 A1* | 6/2020 | Ogale | G05D 1/0221 |
| 2020/0189107 A1 | 6/2020 | Joo | |
| 2020/0189575 A1* | 6/2020 | Wongpiromsarn | B60W 30/09 |
| 2020/0238523 A1 | 7/2020 | Ha | |
| 2021/0197377 A1 | 7/2021 | Gaschler | |
| 2021/0223779 A1 | 7/2021 | Passot | |
| 2021/0341928 A1* | 11/2021 | Sampaio Martins Pereira | |
| | | | G05D 1/0214 |

* cited by examiner

*400*

```
┌─────────────────────────────────────┐
│ Receive an initial plan defining an │
│      initial path having waypoints  │
│                 410                 │
└─────────────────────────────────────┘
                  │
                  ▼
┌─────────────────────────────────────┐
│   Generate alternative paths        │
│   including modifications to one    │
│          or more waypoints          │
│                 420                 │
└─────────────────────────────────────┘
                  │
                  ▼
┌─────────────────────────────────────┐
│  Evaluate a total time duration of  │
│        each alternative path        │
│                 430                 │
└─────────────────────────────────────┘
                  │
                  ▼
┌─────────────────────────────────────┐
│ Select an alternative path having a │
│ total time duration less than a     │
│ total time duration of the          │
│ initial plan                        │
│                 440                 │
└─────────────────────────────────────┘
```

FIG. 4

ROBOT PLAN ONLINE ADJUSTMENT

CROSS-REFERENCE TO RELATED APPLICATIONS

This application is a continuation of U.S. application Ser. No. 16/727,024, filed Dec. 26, 2019, the contents of which are incorporated by reference herein.

BACKGROUND

This specification relates to robotics, and more particularly to planning robotic movements.

Robotics planning refers to scheduling the physical movements of robots in order to perform tasks. For example, an industrial robot that builds cars can be programmed to first pick up a car part and then weld the car part onto the frame of the car. Each of these actions can themselves include dozens or hundreds of individual movements by robot motors and actuators.

Robotics planning has traditionally required immense amounts of manual programming in order to meticulously dictate how the robotic components should move in order to accomplish a particular task. Manual programming is tedious, time-consuming, and error prone. In addition, a schedule that is manually generated for one workcell can generally not be used for other workcells. In this specification, a workcell is the physical environment in which a robot will operate. Workcells have particular physical properties, e.g., physical dimensions, that impose constraints on how robots can move within the workcell. Thus, a manually programmed schedule for one workcell may be incompatible with a workcell having different robots, a different number of robots, or different physical dimensions.

Robotics planning typically includes pre-planning robot motion offline. During online operation, the robot generally is not able to efficiently adapt to changes. For example, if a robot motion plan includes approaching an objective to perform an assigned task, and the objective is not in an expected location, the robot may not be able to reach the objective and may not be able to perform the task.

SUMMARY

This specification describes how a system can adapt robot motion plans during online operation of a robot. The system can receive an initial plan that was generated offline. The initial plan can include the robot maneuvering through an area, or footprint, of a workcell. The initial plan can include moving the robot from a starting point to an end point to perform a task.

In some examples, during online operation, the system may determine that the initial plan requires modification. For example, the initial plan may include moving the robot to an end point that corresponds to an expected location of an objective. A sensor of the robot may detect that the objective is not in the expected location. The system can then adapt the initial plan to move the robot to the new location of the objective, without changing the footprint of the robot motion. In some examples, during online operation, the sensor of the robot may detect that an unexpected obstacle is interfering with the planned path of the robot. The system can adapt the initial plan to reach the end point while avoiding the obstacle, without changing the footprint of the robot motion. By maintaining the same footprint, the robot can avoid interfering with other robots within the same workcell.

In some examples, during online operation, the system can generate and evaluate a number of alternative motion plans, including a number of alternative paths, that may be more efficient than the initial plan. The system can generate alternative motion plans by adjusting properties of individual dynamic waypoints, and interpolating trajectories between waypoints. The system can determine the expected time duration for moving the robot according to each of the alternative motion plans. The system can then select one of the alternative motion plans that can move the robot to the end point in a shorter amount of time than the initial plan.

Particular embodiments of the subject matter described in this specification can be implemented so as to realize one or more of the following advantages. Online path planning with footprint constraints can reduce computation required for deconflicting alternative paths with obstacles. The process can enable robots to adapt to unexpected objective and obstacle locations without regenerating the robot motion plan. The process can enable robots to adjust a path during runtime without needing to deconflict the new path with other robot motion plans. The process makes robot motion planning more flexible and faster. The process reduces the likelihood of collision between robots. The process reduces the likelihood of collision between robots and obstacles. The process reduces the likelihood of the robot entering a fault state due to unexpected obstacles and/or objective locations. The process improves the robot success rate for completing tasks.

Online optimization of path waypoints can shorten time duration for the robot to travel from a starting point to an end point. The process can enable a robot to travel from the starting point to the end point within a time duration based on the kinematic parameters of the individual robot. The process reduces the likelihood of the robot entering a fault state due to exceeding its kinematic parameters. The process can improve computational efficiency by adjusting properties of individual dynamic waypoints and interpolating trajectories. The process improves the speed of completion of tasks.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

FIG. 4 is a flowchart of an example process for online optimization of path waypoints.

Like reference numbers and designations in the various drawings indicate like elements.

DETAILED DESCRIPTION

Figure 1:
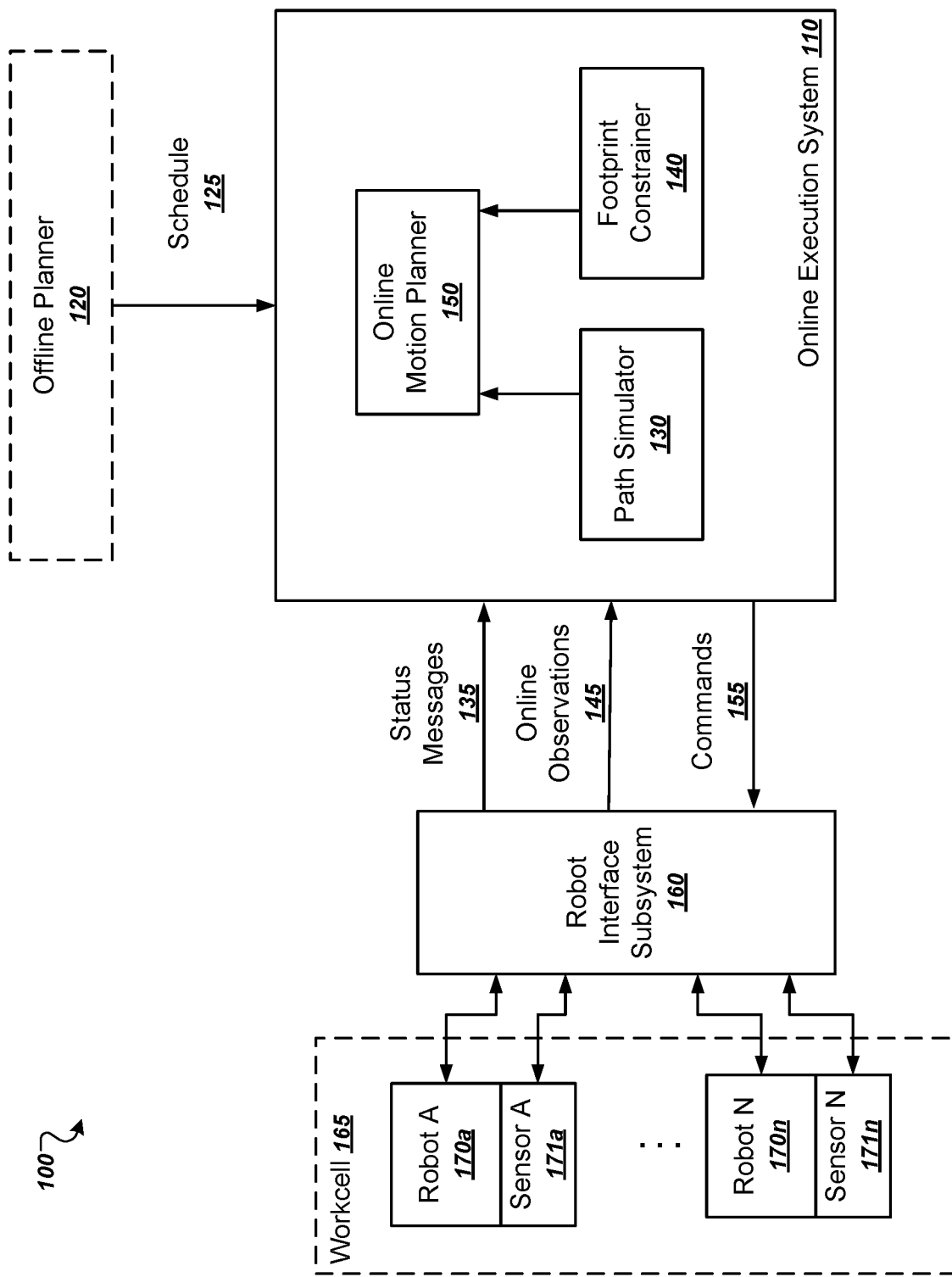
FIG. 1 is a diagram that illustrates an example system.

FIG. 1 is a diagram that illustrates an example system 100. The system 100 is an example of a system that can implement the online robotic control techniques described in this specification.

The system 100 includes a number of functional components, including an online execution system 110 and a robot interface subsystem 160. Each of these components can be implemented as computer programs installed on one or more computers in one or more locations that are coupled to each other through any appropriate communications network, e.g., an intranet or the Internet, or combination of networks.

In general, the online execution system 110 provides commands 155 to be executed by the robot interface subsystem 160, which drives one or more robots, e.g., robots 170a-n, in a workcell 165. In order to compute the commands 155, the online execution system 110 consumes status messages 135 generated by the robots 170a-n and online observations 145 made by one or more sensors 171a-n making observations within the workcell 165. As illustrated in FIG. 1, each sensor 171 is coupled to a respective robot 170. However, the sensors need not have a one-to-one correspondence with robots and need not be coupled to the robots. In fact, each robot can have multiple sensors, and the sensors can be mounted on stationary or movable surfaces in the workcell 165.

The robot interface subsystem 160 and the online execution system 110 can operate according to different timing constraints. In some implementations, the robot interface subsystem 160 is a real-time software control system with hard real-time requirements. Real-time software control systems are software systems that are required to execute within strict timing requirements to achieve normal operation. The timing requirements often specify that certain actions must be executed or outputs must be generated within a particular time window in order for the system to avoid entering a fault state. In the fault state, the system can halt execution or take some other action that interrupts normal operation.

The online execution system 110, on the other hand, typically has more flexibility in operation. In other words, the online execution system 110 may, but need not, provide a command 155 within every real-time time window under which the robot interface subsystem 160 operates. However, in order to provide the ability to make sensor-based reactions, the online execution system 110 may still operate under strict timing requirements. In a typical system, the real-time requirements of the robot interface subsystem 160 require that the robots provide a command every 5 milliseconds, while the online requirements of the online execution system 110 specify that the online execution system 110 should provide a command 155 to the robot interface subsystem 160 every 20 milliseconds. However, even if such a command is not received within the online time window, the robot interface subsystem 160 need not necessarily enter a fault state.

Thus, in this specification, the term online refers to both the time and rigidity parameters for operation. The time windows are larger than those for the real-time robot interface subsystem 160, and there is typically more flexibility when the timing constraints are not met.

The system 100 can also optionally include an offline planner 120. The overall goal of the offline planner 120 is to generate, from a definition of one or more tasks to be performed, a schedule that will be executed by the robots 170a-n to accomplish the tasks. In this specification, a schedule is data that assigns each task to at least one robot. A schedule also specifies, for each robot, a sequence of actions to be performed by the robot. A schedule also includes dependency information, which specifies which actions must not commence until another action is finished. A schedule can specify start times for actions, end times for actions, or both.

The offline planning process is typically computationally expensive. Thus, in some implementations, the offline planner 120 is implemented by a cloud-based computing system comprising many, possibly thousands, of computers. The offline planner 120 is thus commonly physically remote from a facility that houses the workcell 165. On the other hand, the online execution system 110 is typically local to the facility that houses the workcell 165.

This arrangement thus provides three different computing zones. The offline planner 120 can use massive cloud-based computing resources to consider many possibilities for scheduling tasks, while also allowing for online reaction to unanticipated events by the online execution system 110, while also providing the precision and real-time safety mechanisms of the robot interface subsystem 160.

Thus, in operation, the online execution system 110 obtains a workcell-specific schedule 125 and issues commands 155 to the robot interface subsystem 160 in order to actually drive the movements of the moveable components, e.g., the joints, of the robots 170a-n. In some implementations, the robot interface subsystem 160 provides a hardware-agnostic interface so that the commands 155 issued by online execution system 110 are compatible with multiple different versions of robots. During execution the robot interface subsystem 160 can report status messages 135 back to the online execution system 110 so that the online execution system 110 can make online adjustments to the robot movements, e.g., due to local faults or other unanticipated conditions.

In execution, the robots 170a-n generally continually execute the commands specified explicitly or implicitly by the motion plans to perform the various tasks or transitions of the schedule. The robots can be real-time robots, which means that the robots are programmed to continually execute their commands according to a highly constrained timeline. For example, each robot can expect a command from the robot interface subsystem 160 at a particular frequency, e.g., 100 Hz or 1 kHz. If the robot does not receive a command that is expected, the robot can enter a fault mode and stop operating.

The online execution system 110 includes an online motion planner 150. The online motion planner 150 can adjust the robot motion plans while the robots are online. The online motion planner 150 can adjust the robot motion plans based on constraints and input from the footprint constrainer 140 and the path simulator 130.

The online execution system 110 includes a footprint constrainer 140. The system can receive an initial plan that was generated offline. The initial plan can include the robot maneuvering through an area, or footprint, of a workcell. The initial plan can include moving the robot from a starting point to an end point. The footprint constrainer 140 can identify the footprint of the initial plan.

The footprint constrainer 140 can receive queries of a motion path, or part of a motion path, from the online motion planner 150. In some implementations, the footprint constrainer 140 returns true for a motion path that is within the footprint, or a counterexample for a motion path that includes one or more points that violate the footprint. In some implementations, the footprint constrainer 140 may report a part of the motion path that is the shortest distance from the footprint. The footprint constrainer 140 may also report a direction in which one or more waypoints should be moved to satisfy footprint constraints.

The footprint constrainer 140 can generate constraints to keep any adjusted robot motion plans within the footprint. The footprint constrainer 140 can provide footprint constraints to the online motion planner 150. For example, footprint constraints can include Cartesian coordinates that bound the area limits of robot motion. The footprint constrainer 140 may generate the footprint offline or during online operation. In some examples, the footprint can be generated by the offline planner 120 offline. To assist with trajectory adaptation, the offline planner 120 can provide a graph structure of alternative paths inside the footprint to the online execution system 110.

In some examples, during online operation, the online execution system 110 may determine that the initial plan needs to be modified. For example, the initial plan may include moving the robot 170 to an end point that corresponds to an expected location of an objective. When the robot 170 is online, the sensor 171 of the robot 170 may detect the actual location of the objective. The sensor 171 can send sensor input to the robot interface subsystem 160, which can send the online observation 145 of the actual objective location to the online execution system 110.

When the online execution system 110 receives the online observations 145, the online execution system 110 can determine that the objective is not in the expected location. The online motion planner 150 can then generate a motion plan to maneuver the robot 170 to the actual objective location, within the constraints provided by the footprint constrainer 140. Thus, the online motion planner 150 can adapt the initial plan to move the robot 170 to the new location of the objective, without changing the footprint of the robot motion.

In some examples, during online operation, the sensor 171 of the robot 170 may detect that an unexpected obstacle is interfering with the planned path of the robot. The sensor 171 can send sensor input to the robot interface subsystem 160, which can send the online observation 145 of the obstacle location to the online execution system 110.

When the online execution system 110 receives the online observations 145, the online execution system 110 can determine that the obstacle is interfering with the planned robot motion path. The online motion planner 150 can then generate a motion plan to maneuver the robot 170 to the end point while avoiding the obstacle, within the constraints provided by the footprint constrainer 140. Thus, the online motion planner 150 can adapt the initial plan to maneuver the robot 170 around the obstacle, without changing the footprint of the robot motion.

The online motion planner 150 can also analyze and select alternative robot motion plans that may be more efficient than the initial plan. The system can receive an initial plan that was generated offline. The initial plan can include moving the robot from a starting point to an end point.

In some examples, when the robot 170 is online, the online motion planner 150 can evaluate a number of alternative motion plans, including a number of alternative paths. The online motion planner 150 can analyze multiple alternative motion plans using input from the path simulator 130. The path simulator 130 can estimate an amount of time that the robot 170 will take to traverse each motion plan. The online motion planner 150 can select one of the alternative motion plans that can move the robot to the end point in a shorter amount of time than the initial plan.

Figure 2:
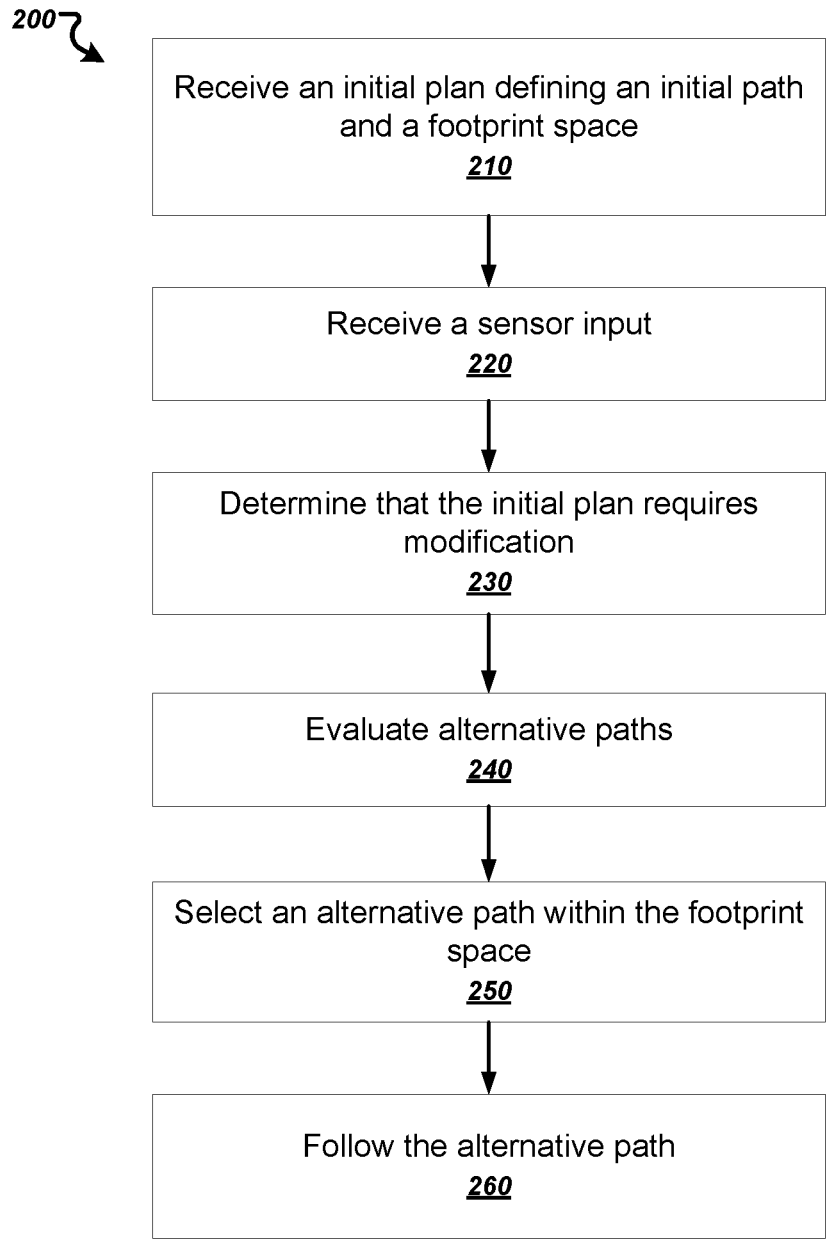
FIG. 2 is a flowchart of an example process for online path planning within a footprint.

FIG. 2 is a flowchart of an example process 200 for online path planning within a footprint. Briefly, the process 200 includes receiving an initial plan defining an initial path and a footprint space (210), receiving a sensor input (220), determining that the initial plan requires modification (230), evaluating alternative paths (240), selecting an alternative path within the footprint space (250), and following the alternative path (260).

In additional detail, the process 200 includes receiving an initial plan defining an initial path and a footprint space (210). The initial plan is a plan for performing a particular task with a robot having a sensor. The initial plan defines an initial path having a plurality of waypoints. The initial plan defines a footprint space for performing the particular task. In some examples, the initial plan is computed offline. For example, the initial plan can be computed by the offline planner 120. The initial plan can include moving the robot, by way of the initial path, to an objective. The initial plan can also include avoiding collisions with obstacles within the workcell. The objective can be a location where the robot is expected to perform the task. The footprint space can be a space that is larger than the space occupied by the robot when transiting the initial path, and that does not conflict with motion plans of other robots.

The process 200 includes receiving a sensor input (220). The sensor can be, for example, an optical sensor. The sensor can be an active or passive sensor. The sensor can collect sensor input that indicates a location of one or more objectives within a workcell. The objectives can be associated with tasks. For example, the robot may need to move to an objective location in order to complete a task. The sensor can also collect sensor input that indicates a location of obstacles within the workcell.

The process 200 includes determining that the initial plan requires modification (230). Specifically, the process 200 includes determining, from the sensor input, that the initial plan requires modification to complete the particular task. For example, based on the sensor input, the online execution system 110 may determine that one or more objectives is positioned in a location that is different from an expected objective location specified in the initial plan. In another example, based on the sensor input, the online execution system 110 may determine that an obstacle lies on the initial path defined by the initial plan.

The process 200 includes evaluating alternative paths (240). Evaluating alternative paths includes evaluating a plurality of alternative paths, each alternative path having a respective plurality of alternative waypoints. Evaluating alternative paths includes rejecting one or more alternative paths having any alternative waypoints that are outside the footprint space defined by the initial plan. In some examples, evaluating the plurality of alternative paths is performed online. Evaluating the plurality of alternative paths can include generating a plurality of alternative paths. Generating the plurality of alternative paths can include performing respective modifications to one or more waypoints of the initial plan. For example, using the initial path as a starting point, the process 200 can include sampling alternative waypoints and examining whether the alternative waypoints are outside the footprint space defined by the initial plan. The process 200 can reject any paths that include waypoints that are outside the footprint space.

The process 200 includes selecting an alternative path within the footprint space (250). Specifically, the process 200 includes selecting an alternative path having alternative waypoints that are all within the footprint space defined by the initial plan. The alternative path can be a path that guides the robot from a starting point to an objective, while avoiding obstacles. Since the alternative waypoints are all within the footprint space defined by the initial plan, the robot motion will not conflict with motion plans of other robots within the workcell. The process 200 includes quickly selecting the alternative path, in order to reduce any delay in robot motion.

The process 200 includes following the alternative path (260). The robot follows the alternative path having alternative waypoints within the footprint space defined by the initial plan. When following the alternative path, the robot remains within the footprint. Thus, the robot does not conflict with other robot motion plans. The robot can traverse the alternative path to the objective, while avoiding obstacles.

Figure 3B:
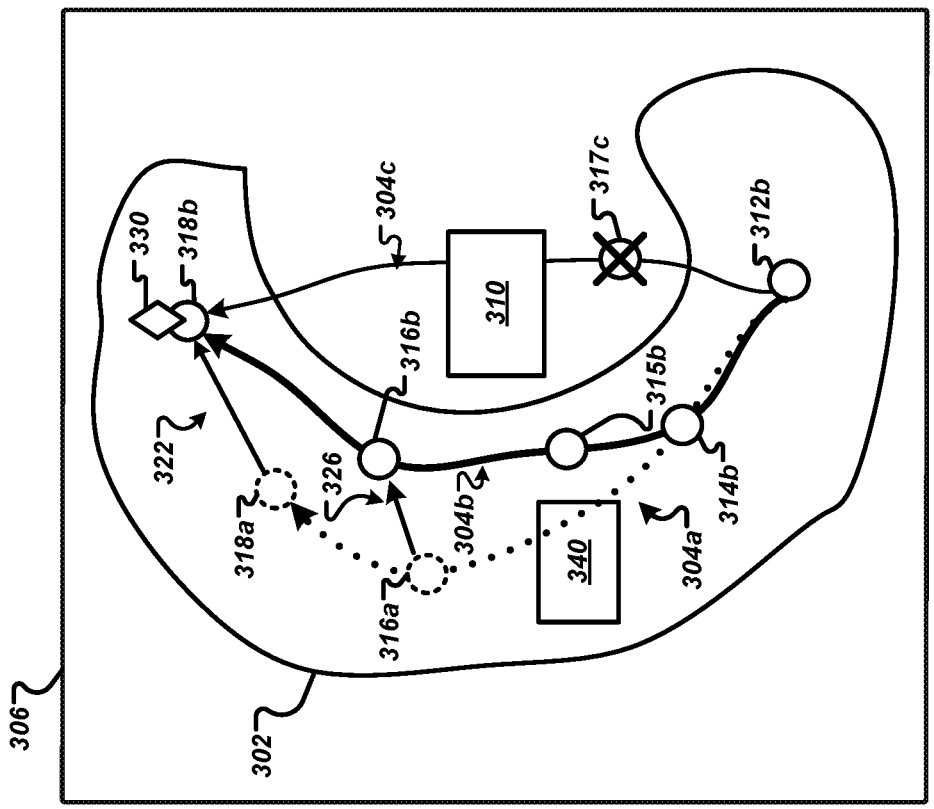
FIGS. 3A and 3B illustrate generating robot motion paths within a footprint.
Figure 3A:
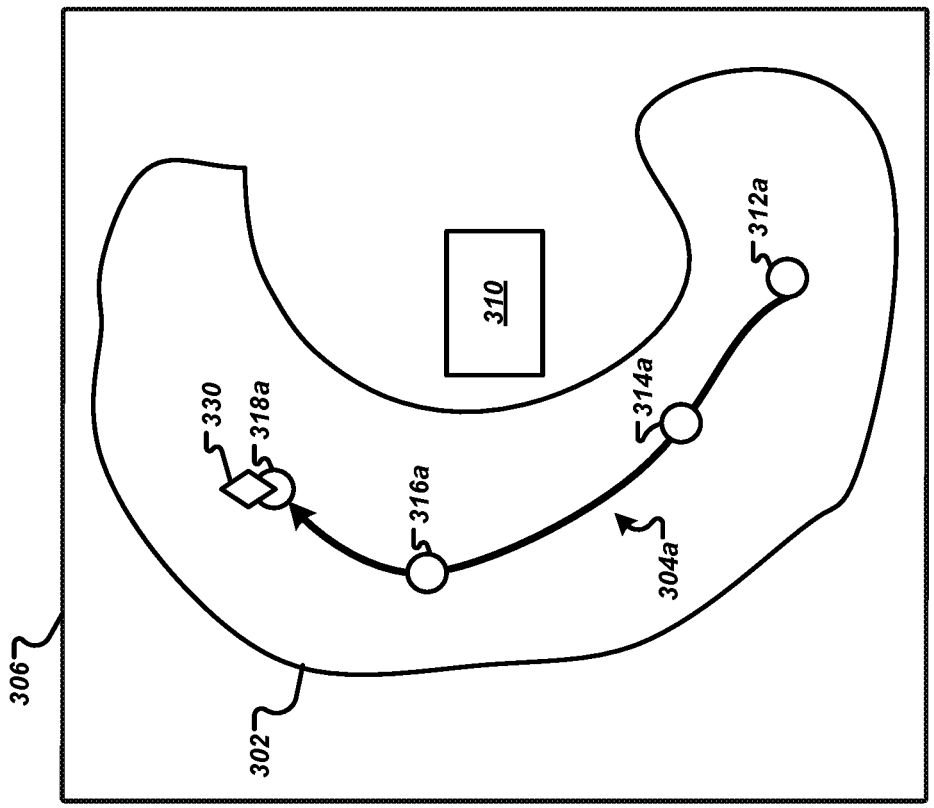

FIGS. 3A and 3B illustrate generating alternative robot motion paths within a footprint. FIG. 3A shows an example initial path 304a with a footprint 302 within a workcell 306. FIG. 3B shows an example alternative path 304b within the footprint 302.

The footprint 302 can be a reserved space for the robot to occupy. The footprint 302 can be a three dimensional space within the workcell 306. The footprint 302 can be larger than the actual area occupied by the robot while following initial path 304a. For example, the footprint 302 can include the area occupied by the robot at each point along the initial path 304a, as well as a margin. The margin can allow for flexibility in online motion planning, while avoiding conflicts with other robot footprints.

In some examples, the footprint 302 can be defined by ranges of coordinates within which the robot can move within. For example, a three dimensional Cartesian coordinate system can be mapped to the workcell 306. The footprint 302 can then be bound within designated coordinate limits.

In some examples, the footprint 302 can be defined by spatial representations. For example, the footprint 302 can be defined by a shape of a specified size, centered at specified coordinates. In some examples, the footprint can be defined by a swept volume with an offset distance in each direction. In some examples, a footprint can be a combination of geometric meshes or swept volumes of a geometric meshes swept along a path. In some examples, a footprint can be provided as an approximation by discrete voxel grids, or sets of convex polyhedra, to improve computation speed of inclusion checks.

The defined footprint 302 can be stored by the footprint constrainer 140, including the specified coordinates, shapes, sizes, meshes, grids, polyhedra, and offsets, as applicable.

FIG. 3A shows an example initial path 304a of the initial plan. The initial plan can be generated offline. For example, the initial plan can be generated by the offline planner 120. The initial plan defines a space of the footprint 302 and the initial path 304a. The initial path 304a is part of an initial plan for performing a particular task. To complete the task, the robot needs to travel from the waypoint 312a to an objective 330. The offline planner 120 can generate the initial path 304a to guide the robot to the objective 330 at an expected location corresponding with waypoint 318a. The initial path 304a includes waypoints 312a, 314a, 316a, 318a. The waypoint 312a is a starting waypoint corresponding to the expected starting position of the robot. The waypoint 318a is a final waypoint corresponding to the expected position of the objective 330.

The initial plan can consider known obstacles. Obstacles can include, for example, walls, objects, or other robots. For example, an obstacle 310 is known to be present in the workcell 306. The offline planner 120 can generate the initial path 304a to avoid the expected location of the obstacle 310.

The robot has a sensor 320. The sensor can be, for example, an optical sensor, e.g., a camera. During online operation, the sensor 320 can collect and send sensor input to the robot interface subsystem 160. Based on the sensor input, the robot interface subsystem 160 can send online observations 145 to the online execution system 110. The online execution system 110 can determine from the online observations 145 that the initial plan requires modification.

FIG. 3B shows an example alternative path 304b. The alternative path 304b can be generated by the online motion planner 150 based on sensor input and input from the footprint constrainer 140.

In some examples, the sensor input can include images of the objective 330 within the workcell 306. The objective 330 may be expected to be located at the waypoint 318a. Based on the sensor input, the online execution system 110 may determine that the objective 330 is offset from the waypoint 318a by a vector 322. Thus, the online execution system 110 can determine that the initial plan requires modification in order for the robot to reach the objective 330.

In some examples, the sensor input can include images of an obstacle 340 within the workcell 306. The presence of the obstacle 340 may be unexpected, e.g., the initial plan may not have considered the presence of the obstacle 340. In some examples, the presence of the obstacle 340 is not unexpected, but the location of the obstacle 340 may be a different location from the expected location. Based on the sensor input, the online execution system 110 may determine that the obstacle 340 is obstructing the initial path 304a. For example, the online execution system 110 may determine that the obstacle 340 lies on the initial path 304a. In another example, the online execution system 110 may determine that the obstacle 340 is located within a threshold distance to the initial path 304a. Thus, the online execution system 110 can determine that the initial plan requires modification in order to avoid the obstacle 340.

In response to determining that the initial plan requires modification, the online execution system 110 can command the online motion planner 150 to perform collision-free path planning. Collision-free path planning can include modifying the initial path 304a to move the robot from the waypoint 312a to the objective 330, while avoiding collisions with other robots or obstacles, e.g., the obstacles 310, 340 within the workcell 306. In some examples, the path planning can include modifying the initial path 304a such that the alternative path 304b does not approach within a threshold range to any obstacles. Collision-free path planning produces an alternative path 304b. The alternative path 304b includes alternative waypoints 312b, 314b, 315b, 316b, 318b. The online motion planner 150 can generate the alternative path 304b quickly during runtime.

To generate the alternative path 304b, the online motion planner 150 can start with the initial path 304a as the nominal path. The online motion planner 150 can sample candidate alternative waypoints. For each candidate alternative waypoint, the online motion planner 150 can determine if the candidate waypoint conflicts with an obstacle of the workcell 306.

When the online motion planner 150 performs collision-free path planning, the online motion planner 150 can apply the footprint 302 as a constraint. The footprint constrainer 140 can provide coordinates and shapes of the footprint 302 to the online motion planner 150. With the footprint 302 as a constraint, any candidate alternative waypoints must stay within the footprint 302. For each adjustment to the initial path 304a, the online execution system 110 compares the candidate alternative waypoint to the footprint 302.

For example, the online motion planner 150 may generate a candidate alternative waypoint 317c. The online motion planner 150 determines that the candidate waypoint 317c does not conflict with either of the obstacles 310 or 340. However, the motion planner 150 determines that the candidate waypoint 317c is outside of the footprint 302. Therefore, the online motion planner 150 rejects the candidate waypoint 317c, and any candidate alternative paths, e.g., candidate alternative path 304c, that include the candidate waypoint 317c. By rejecting candidate alternative waypoints, e.g., 317c, that are outside of the footprint 302, the online motion planner 150 can avoid conflicts between the robot and obstacles.

In some examples, to perform path planning, the online motion planner 150 can adjust one or more of the waypoints 312a, 314a, 316a, 318a to generate alternative waypoints. For example, the online motion planner 150 adjusts the waypoint 318a by the vector 322 to generate the alternative waypoint 318b. The online motion planner 150 also adjusts the waypoint 316a by a vector 326 to generate the alternative waypoint 316b. The online motion planner 150 determines that it is not necessary to move the waypoint 314a. Thus, the alternative waypoint 314b is in the same location as the waypoint 314a. The alternative starting waypoint 312b remains the same as the starting waypoint 312a.

In some examples, to perform path planning, the online motion planner 150 can add new alternative waypoints, in addition to or instead of adjusting waypoints. For example, the online motion planner 150 can add alternative waypoint 315b. The online motion planner 150 can add alternative waypoints in order to provide more detailed path planning for the robot. For example, the alternative path 304b passes between the obstacles 310 and 340. The online motion planner 150 can add the alternative waypoint 315b to provide more detailed path planning where the robot passes between the two obstacles. Adding the waypoint 315b can reduce the likelihood of collision between the robot and the obstacles 310, 340.

The amount by which the online motion planner 150 adjusts each waypoint can depend on the distance between the actual location of the objective 330 and the predicted location of the objective 330. A smaller distance can require minor adjustments to the waypoints. For example, with a smaller distance, the online motion planner 150 may adjust only the final waypoint 318a. With a larger distance, the online motion planner 150 may adjust both the final waypoint 318a and the waypoint 316. Thus, a larger distance between the actual and predicted location of the objective 330 can result in the online motion planner 150 deforming the initial path 304a to a greater extent, in order to generate the alternative path 304b.

By using the initial path 304a as a starting point, and making minor adjustments to waypoints, the online motion planner 150 can generate the alternative path 304b while minimizing an increase in time required for the robot to traverse the alternative path 304b. For example, the robot may traverse the alternative path 304b in a time duration that is only slightly longer than the time duration required to traverse the initial path 304a.

Additionally, by using the initial path 304a as a starting point, and making minor adjustments to waypoints, the online motion planner 150 can maintain a smooth path without abrupt movements and changes in direction. For example, by adjusting both the waypoints 318a and 316a, the online motion planner 150 generates the alternative path 304b that includes gradual changes in direction at each waypoint.

Since the online motion planner 150 uses the footprint 302 as a constraint, the online motion planner 150 can evade deconflicting the alternative path 304b with motion plans of other robots. Rather, deconfliction between the footprint 302 and the motion plans of other robots is performed by the offline planner 120 offline. Additionally, by using the footprint 302 as a constraint, the online motion planner 150 can evade deconflicting the alternative path 304b with known obstacles in their expected locations, since locations of known obstacles are also considered by the offline planner 120.

After generating the alternative path 304b, the online motion planner 150 can optimize the alternative path 304b by making adjustments to properties of the alternative waypoints. The process for optimizing path waypoints is described with reference to FIGS. 4, 5A, and 5B.

FIG. 4 is a flowchart of an example process 400 for online optimization of path waypoints. The process 400 can be performed quickly during online operation. The process 400 can be used to quickly and efficiently compute the effects of waypoint adjustments on the total time duration for a robot trajectory. The process 400 selects and applies an alternative path that reduces the total time duration compared to the initial plan. Briefly, the process 400 includes receiving an initial plan defining an initial path having waypoints (410), generating alternative paths including modifications to one or more waypoints (420), evaluating a total time duration of each alternative path (430), and selecting an alternative path having a total time duration less than a total time duration of the initial plan (440).

In additional detail, the process 400 includes receiving an initial plan defining an initial path having waypoints (410). The initial plan is a plan for performing a particular task with a robot. The initial plan defines an initial path having a plurality of waypoints. Each waypoint is associated with a target position and a target velocity. In some examples, the initial plan is computed offline. For example, the initial plan can be computed by the offline planner 120. In some examples, the initial plan is computed online. For example, the initial plan can be computed by the online motion planner 150, using the process described with reference to FIGS. 2, 3A, and 3B. Specifically, the alternative path of the process 200 can be the initial path of the process 400. The initial plan can include moving the robot, by way of the initial path, to an objective. The initial plan can also include avoiding collisions with obstacles within the workcell. The objective can be a location where the robot is expected to perform the task. The target position of each waypoint can include an expected location and pose of the robot when the robot passes through the waypoint. The target velocity of each waypoint can include an expected speed and direction of the robot when the robot passes through the waypoint. In some examples, each waypoint is associated with a respective acceleration value. The acceleration value can be the expected acceleration of the robot when the robot passes through the waypoint.

The process 400 includes generating alternative paths including modifications to one or more waypoints (420). Specifically, the process 400 includes generating a plurality of alternative paths including performing respective modifications to one or more waypoints in the initial plan. In some examples, generating the plurality of alternative paths is performed online. Generating the plurality of alternative paths can include performing respective modifications to one or more waypoints of the initial plan. For example, using the initial path as a starting point, the process 400 can perform modifications to one or more waypoints to reduce overall travel time of the robot. In some examples, performing respective modifications to one or more waypoints in the initial plan can include modifying a respective velocity associated with each waypoint. In some examples, performing respective modifications to one or more waypoints in the initial plan can include modifying a respective acceleration value associated with each waypoint. In some examples, performing respective modifications to one or more waypoints in the initial plan can include modifying a position of a waypoint and performing an interpolation process to modify a corresponding velocity for the waypoint.

The process 400 includes evaluating a total time duration of each alternative path (430). Each alternative path is evaluated according to a simulated total time duration required for the robot to traverse the alternative path. To simulate the total time duration, the process can estimate how long the robot will take to execute the alternative path to reach the objective. The simulation can include modifying one or more waypoints. Modifying a waypoint can include modifying one or more of the waypoint position, velocity, or acceleration. The simulation can include using kinematic parameters of the robot. Kinematic parameters of the robot can include a maximum velocity and maximum acceleration of the robot. Kinematic parameters of the robot can also include, for example, a turning radius of the robot. Kinematic parameters can also include maximum velocities and accelerations of the robot while turning or pivoting. Evaluating each alternative path can include using the kinematics parameters of the robot to compute the expected total time duration for the robot to traverse the alternative path.

The process 400 includes selecting an alternative path having a total time duration less than a total time duration of the initial plan (440). The process 400 can optimize the motion plan for overall duration. The robot can follow the alternative path to reach the objective, while reducing the duration of robot travel compared to the duration of robot travel for the initial path.

Figure 5B:
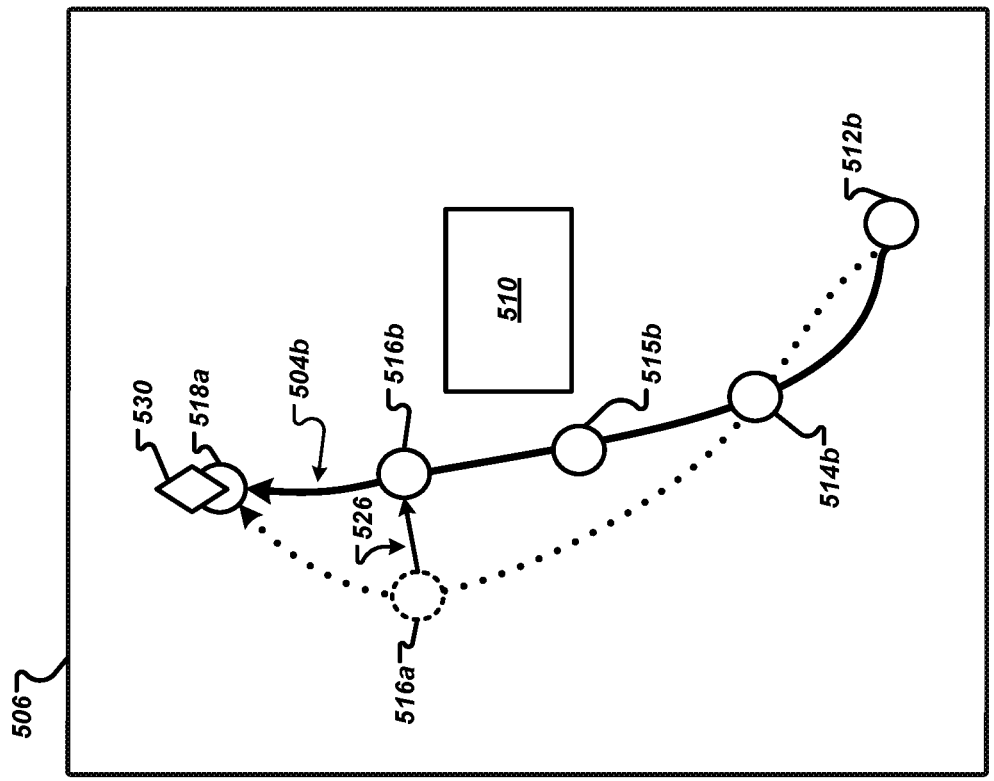
FIGS. 5A and 5B illustrate generating robot motion paths with optimized waypoints.
Figure 5A:
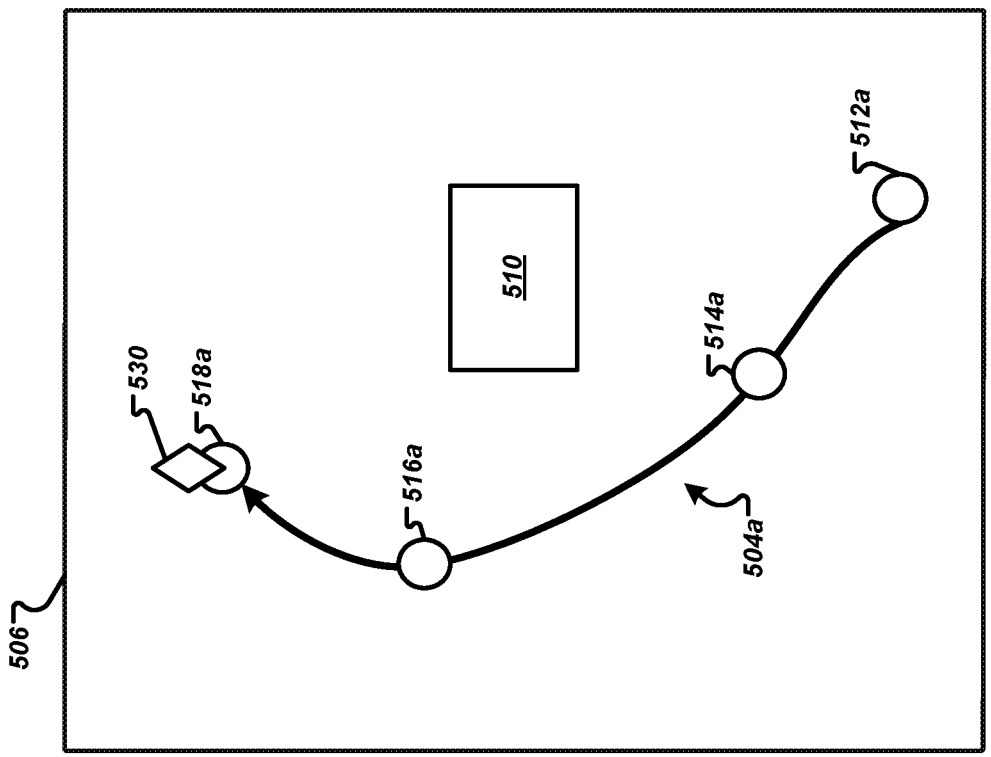

FIGS. 5A and 5B illustrate generating robot motion paths with optimized waypoints. FIG. 5A shows an example initial path 504a within a workcell 506. FIG. 5B shows an example alternative path 504b within the workcell 506.

FIG. 5A illustrates generating robot motion paths with optimized waypoints. FIG. 5A shows an example initial plan within a workcell 506. The initial plan includes an initial path 504a for a robot. The initial path 504a includes waypoints 512a, 514a, 516a, 518a. In some examples, the initial plan can be generated offline. For example, the initial plan can be generated by the offline planner 120.

In some examples, the initial plan can be generated during online operation. For example, the initial path 504a can be the alternative path 304b generated by the online motion planner 150 as described with reference to FIGS. 3A and 3B. After generating the alternative path 304b in response to determining that the initial plan requires modification, the online motion planner 150 can optimize the waypoints of the alternative path 304b.

The initial plan defines the initial path 504a. The initial path 504a is part of an initial plan for performing a particular task. To complete the task, the robot needs to travel from the waypoint 512a to an objective 530. The offline planner 120 can generate the initial path 504a to guide the robot to the objective 530 at an expected location corresponding with waypoint 518a. The initial path 504a includes waypoints 512a, 514a, 516a, 518a. The waypoint 512a is a starting waypoint corresponding to an expected starting position of the robot. The waypoint 518a is a final waypoint corresponding to the expected position of the objective 530.

The initial plan can consider known obstacles. For example, an obstacle 510 is known to be present in the workcell 506. The offline planner 120 can generate the initial path 504a to avoid the expected location of the known obstacle 510.

The waypoints 512a, 514a, 516a, 518a can be dynamic waypoints. A dynamic waypoint can include multiple properties. Properties of dynamic waypoints can include a target position, velocity, and/or acceleration. The target position of each waypoint can include an expected location and pose of the robot when the robot passes through the waypoint. The target velocity of each waypoint can include an expected speed and direction of the robot when the robot passes through the waypoint. The target acceleration value can be the expected acceleration of the robot when the robot passes through the waypoint.

In general, target velocities for starting waypoints, e.g., the waypoint 512a, and final waypoints, e.g., the waypoint 518a, are zero. In general, target velocities for intermediate waypoints, e.g., the waypoints 514a and 516a, are non-zero. Assigning target velocities and/or accelerations to waypoints can result in a robot motion plan that includes a position of the robot over time. The robot motion can be modeled as a smooth function in both time and space.

FIG. 5B shows an example alternative path 504b. The alternative path 504b can be generated by the online motion planner 150 based on input from the path simulator 130.

During online operation, the online motion planner 150 can adjust the robot motion plan by selecting an alternative path 504b that may be a shorter total time duration than the initial path 504a. The online motion planner 150 can adjust the robot motion plan based on multiple alternative paths generated and analyzed by the online motion planner 150. In some examples the online motion planner 150 can search in a graph of alternative path segments, all within a permitted footprint, that was prepared by the offline planner 120. The online motion planner 150 can select and implement the alternative path 504b quickly during runtime.

To generate the alternative path 504b, the online motion planner 150 can start with the initial path 504a as the nominal path. The online motion planner can adjust waypoint positions, sample alternative waypoints within the footprint at random, and/or adjust blending parameters of path segments. For each alternative waypoint, the online motion planner 150 can determine if the alternative waypoint conflicts with an obstacle of the workcell 506.

Generating alternative waypoints can include adjusting one or more properties of one or more dynamic waypoints. For example, generating alternative waypoints can include adjusting target positions, velocities, and/or accelerations of the waypoints of the initial path 504a.

The online motion planner 150 can generate the alternative waypoints using kinematic parameters of the robot. Kinematics parameters can specify, for example, a maximum velocity or a maximum acceleration for the individual robot. The online motion planner 150 can generate the alternative waypoints, including target positions, velocities, and accelerations, that do not cause the robot to exceed its kinematic parameters. Thus, the online motion planner 150 can generate alternative waypoints that are tailored to the individual robot that is assigned to perform the task.

In some examples, to perform path reduction, the online motion planner 150 can adjust target positions of one or more of the waypoints 512a, 514a, 516a, 518a to generate alternative waypoints. For example, the online motion planner 150 adjusts the position of waypoint 516a by a vector 526 to generate the alternative waypoint 516b. The online motion planner 150 does not move the position of waypoint 514a. Thus, the alternative waypoint 514b is in the same location as the waypoint 514a. The alternative starting waypoint 512b remains in the same position as the starting waypoint 512a, and the alternative final waypoint 518b remains in the same position as the final waypoint 518a. By adjusting the position of the waypoint 516a to generate the alternative waypoint 516b, the online motion planner 150 can reduce the total time for the robot to traverse the alternative path 504b, compared to the total time to traverse the initial path 504a.

In some examples, to perform path reduction, the online motion planner 150 can adjust target velocities of one or more of the waypoints 512a, 514a, 516a, 518a to generate alternative waypoints. For example, the initial path 504a includes a sharper turn at the waypoint 516a than the alternative path 504b includes at the waypoint 516b. Therefore, the robot kinematics may specify that the robot is able to pass through the waypoint 516b at a greater velocity than through the waypoint 516a. Based on the kinematics of the robot, the online motion planner 150 can determine to increase the target velocity at the waypoint 516b. By increasing the target velocity at waypoint 516b, the online motion planner 150 can reduce the total time for the robot to traverse from the starting waypoint 512b to the final waypoint 518b.

In some examples, to perform path reduction, the online motion planner 150 can modify a position of a waypoint and performing an interpolation process to modify a corresponding velocity for the waypoint. For example, the online motion planner 150 can adjust the position of waypoint 516a by a vector 526 to generate the alternative waypoint 516b. The online motion planner 150 can then perform an interpolation process to modify a corresponding velocity for the alternative waypoint 516b. The online motion planner 150 can modify the velocity of the alternative waypoint 516b based on interpolating between a velocity of a preceding waypoint 515b and a following waypoint 518b.

Interpolating between waypoints can enable the online motion planner 150 to use fewer waypoints to achieve the desired robot motion path. By interpolating between waypoints, the online motion planner can generate the robot trajectory for each individual segment of the path between waypoints.

In some examples, to perform path reduction, the online motion planner 150 can adjust target accelerations of one or more of the waypoints 512a, 514a, 516a, 518a to generate alternative waypoints. For example, based on the kinematics of the robot, the online motion planner 150 can determine to increase the target acceleration at the waypoint 514b. By increasing the target acceleration at waypoint 514b, the online motion planner 150 can reduce the total time for the robot to traverse from the starting waypoint 512b to the final waypoint 518b.

In some examples, to perform path reduction, the online motion planner 150 can add new alternative waypoints, in addition to or instead of adjusting waypoints. For example, the online motion planner 150 can add alternative waypoint 515b. The online motion planner 150 can add alternative waypoints in order to provide more detailed path planning for the robot. For example, the alternative path 504b passes nearer to the obstacle 510 than the initial path 504a. The online motion planner 150 can add the alternative waypoint 515b to provide more detailed path planning where the robot passes near to the obstacle 510. Adding the waypoint 515b can give the online motion planner 150 more control over the shape of the alternative path 504b. Therefore, adding the waypoint 505b allows the online motion planner 150 to plan a shorter path that still avoids the obstacle 510 at a safe distance.

The online motion planner 150 can evaluate multiple alternative paths. To evaluate alternative paths, the online motion planner 150 can receive input from the path simulator 130. The path simulator 130 can simulate a total time duration for the robot to travel through the alternative waypoints. For example, the path simulator 130 can simulate robot travel time through the alternative waypoints 512b, 514b, 515b, 516b, 518b of the alternative path 504b.

The path simulator 130 can simulate the robot travel time between two alternative waypoints, e.g., the alternative waypoints 514b and 515b, based on the target positions, velocities, and accelerations of the alternative waypoints. The path simulator 130 can compute the time duration of travel between the two alternative waypoints within the kinematic parameters of the robot. The path simulator 130 can repeat the computation with another set of waypoints, e.g., the waypoints 515b and 516b. The path simulator 130 can then compile the results to determine a total time duration for the alternative path 504b.

The online motion planner 150 can compare the simulated total time durations of the alternative paths to a total time duration of the initial plan. The online motion planner 150 can select an alternative path that has a total time duration that is less than the total time duration of the initial plan.

By using the initial path 504 as a starting point, and making minor adjustments to the dynamic waypoint properties, the online motion planner 150 can quickly generate the alternative path 524 during runtime. By interpolating trajectories for individual segments of the alternative path 524, the path simulator 130 can efficiently compute a total time duration of the alternative path 524. The path simulator 130 can also quickly and efficiently analyze the effects of waypoint adjustments on the total time duration.

By using the initial path 504 as a starting point, and making minor adjustments to the dynamic waypoint properties, the online motion planner 150 can also ensure smooth transitions between robot velocities. The online motion planner 150 can also maintain a path that forms a smooth curve in space, without abrupt movements and changes in direction. For example, by adjusting the position of waypoint 516b and adding the waypoint 515b, the online motion planner 150 generates the alternative path 524 that includes gradual changes in direction at each waypoint.

In some implementations, the online motion planner 150 does not plan with the dynamic properties, e.g., velocities and accelerations, of the waypoints. The online motion planner 150 may plan instead with blending parameters of the waypoints. Blending parameters control the smoothing interpolation across subsequent path segments.

To plan with blending parameters, the path simulator 130 can query the robot interface subsystem 160 to simulate and estimate a duration of several segments of a motion path, and a precise shape of the motion path, for a choice of blending parameters. Blending across subsequent motion path segments can introduce a deviation from the motion path, but can reduce the time duration required to traverse the motion path.

Optionally, the path simulator 130 may evaluate marginal duration changes of all motion path segments with respect to blending and velocity parameters. The path simulator 130 can then report to the online motion planner 150 a number of candidate blending and velocity parameter changes, and respective estimated time duration reductions.

Planning with blending parameters can enable trajectory optimization using a variety of robot interfaces. For example, planning with blending parameters can enable trajectory optimization using robot interfaces that do not accept arbitrary motion.

In this specification, a robot is a machine having a base position, one or more movable components, and a kinematic model that can be used to map desired positions, poses, or both in one coordinate system, e.g., Cartesian coordinates, into commands for physically moving the one or more movable components to the desired positions or poses. In this specification, a tool is a device that is part of and is attached at the end of the kinematic chain of the one or more moveable components of the robot. Example tools include grippers, welding devices, and sanding devices.

In this specification, a task is an operation to be performed by a tool. For brevity, when a robot has only one tool, a task can be described as an operation to be performed by the robot as a whole. Example tasks include welding, glue dispensing, part positioning, and surfacing sanding, to name just a few examples. Tasks are generally associated with a type that indicates the tool required to perform the task, as well as a position within a workcell at which the task will be performed.

In this specification, a motion plan is a data structure that provides information for executing an action, which can be a task, a cluster of tasks, or a transition. Motion plans can be fully constrained, meaning that all values for all controllable degrees of freedom for the robot are represented explicitly or implicitly; or underconstrained, meaning that some values for controllable degrees of freedom are unspecified. In some implementations, in order to actually perform an action corresponding to a motion plan, the motion plan must be fully constrained to include all necessary values for all controllable degrees of freedom for the robot. Thus, at some points in the planning processes described in this specification, some motion plans may be underconstrained, but by the time the motion plan is actually executed on a robot, the motion plan can be fully constrained. In some implementations, motion plans represent edges in a task graph between two configuration states for a single robot. Thus, generally there is one task graph per robot.

In this specification, a motion swept volume is a region of the space that is occupied by a least a portion of a robot or tool during the entire execution of a motion plan. The motion swept volume can be generated by collision geometry associated with the robot-tool system.

In this specification, a transition is a motion plan that describes a movement to be performed between a start point and an end point. The start point and end point can be represented by poses, locations in a coordinate system, or tasks to be performed. Transitions can be underconstrained by lacking one or more values of one or more respective controllable degrees of freedom (DOF) for a robot. Some transitions represent free motions. In this specification, a free motion is a transition in which none of the degrees of freedom are constrained. For example, a robot motion that simply moves from pose A to pose B without any restriction on how to move between these two poses is a free motion. During the planning process, the DOF variables for a free motion are eventually assigned values, and path planners can use any appropriate values for the motion that do not conflict with the physical constraints of the workcell.

The robot functionalities described in this specification can be implemented by a hardware-agnostic software stack, or, for brevity just a software stack, that is at least partially hardware-agnostic. In other words, the software stack can accept as input commands generated by the planning processes described above without requiring the commands to relate specifically to a particular model of robot or to a particular robotic component. For example, the software stack can be implemented at least partially by the onsite execution system 110 and the robot interface subsystem 160 of FIG. 1.

The software stack can include multiple levels of increasing hardware specificity in one direction and increasing software abstraction in the other direction. At the lowest level of the software stack are robot components that include devices that carry out low-level actions and sensors that report low-level statuses. For example, robots can include a variety of low-level components including motors, encoders, cameras, drivers, grippers, application-specific sensors, linear or rotary position sensors, and other peripheral devices. As one example, a motor can receive a command indicating an amount of torque that should be applied. In response to receiving the command, the motor can report a current position of a joint of the robot, e.g., using an encoder, to a higher level of the software stack.

Each next highest level in the software stack can implement an interface that supports multiple different underlying implementations. In general, each interface between levels provides status messages from the lower level to the upper level and provides commands from the upper level to the lower level.

Typically, the commands and status messages are generated cyclically during each control cycle, e.g., one status message and one command per control cycle. Lower levels of the software stack generally have tighter real-time requirements than higher levels of the software stack. At the lowest levels of the software stack, for example, the control cycle can have actual real-time requirements. In this specification, real-time means that a command received at one level of the software stack must be executed and optionally, that a status message be provided back to an upper level of the software stack, within a particular control cycle time. If this real-time requirement is not met, the robot can be configured to enter a fault state, e.g., by freezing all operation.

At a next-highest level, the software stack can include software abstractions of particular components, which will be referred to motor feedback controllers. A motor feedback controller can be a software abstraction of any appropriate lower-level components and not just a literal motor. A motor feedback controller thus receives state through an interface into a lower-level hardware component and sends commands back down through the interface to the lower-level hardware component based on upper-level commands received from higher levels in the stack. A motor feedback controller can have any appropriate control rules that determine how the upper-level commands should be interpreted and transformed into lower-level commands. For example, a motor feedback controller can use anything from simple logical rules to more advanced machine learning techniques to transform upper-level commands into lower-level commands. Similarly, a motor feedback controller can use any appropriate fault rules to determine when a fault state has been reached. For example, if the motor feedback controller receives an upper-level command but does not receive a lower-level status within a particular portion of the control cycle, the motor feedback controller can cause the robot to enter a fault state that ceases all operations.

At a next-highest level, the software stack can include actuator feedback controllers. An actuator feedback controller can include control logic for controlling multiple robot components through their respective motor feedback controllers. For example, some robot components, e.g., a joint arm, can actually be controlled by multiple motors. Thus, the actuator feedback controller can provide a software abstraction of the joint arm by using its control logic to send commands to the motor feedback controllers of the multiple motors.

At a next-highest level, the software stack can include joint feedback controllers. A joint feedback controller can represent a joint that maps to a logical degree of freedom in a robot. Thus, for example, while a wrist of a robot might be controlled by a complicated network of actuators, a joint feedback controller can abstract away that complexity and exposes that degree of freedom as a single joint. Thus, each joint feedback controller can control an arbitrarily complex network of actuator feedback controllers. As an example, a six degree-of-freedom robot can be controlled by six different joint feedback controllers that each control a separate network of actual feedback controllers.

Each level of the software stack can also perform enforcement of level-specific constraints. For example, if a particular torque value received by an actuator feedback controller is outside of an acceptable range, the actuator feedback controller can either modify it to be within range or enter a fault state.

To drive the input to the joint feedback controllers, the software stack can use a command vector that includes command parameters for each component in the lower levels, e.g. a positive, torque, and velocity, for each motor in the system. To expose status from the joint feedback controllers, the software stack can use a status vector that includes status information for each component in the lower levels, e.g., a position, velocity, and torque for each motor in the system. In some implementations, the command vectors also include some limit information regarding constraints to be enforced by the controllers in the lower levels.

At a next-highest level, the software stack can include joint collection controllers. A joint collection controller can handle issuing of command and status vectors that are exposed as a set of part abstractions. Each part can include a kinematic model, e.g., for performing inverse kinematic calculations, limit information, as well as a joint status vector and a joint command vector. For example, a single joint collection controller can be used to apply different sets of policies to different subsystems in the lower levels. The joint collection controller can effectively decouple the relationship between how the motors are physically represented and how control policies are associated with those parts. Thus, for example if a robot arm has a movable base, a joint collection controller can be used to enforce a set of limit policies on how the arm moves and to enforce a different set of limit policies on how the movable base can move.

At a next-highest level, the software stack can include joint selection controllers. A joint selection controller can be responsible for dynamically selecting between commands being issued from different sources. In other words, a joint selection controller can receive multiple commands during a control cycle and select one of the multiple commands to be executed during the control cycle. The ability to dynamically select from multiple commands during a real-time control cycle allows greatly increased flexibility in control over conventional robot control systems.

At a next-highest level, the software stack can include joint position controllers. A joint position controller can receive goal parameters and dynamically compute commands required to achieve the goal parameters. For example, a joint position controller can receive a position goal and can compute a set point for achieve the goal.

At a next-highest level, the software stack can include Cartesian position controllers and Cartesian selection controllers. A Cartesian position controller can receive as input goals in Cartesian space and use inverse kinematics solvers to compute an output in joint position space. The Cartesian selection controller can then enforce limit policies on the results computed by the Cartesian position controllers before passing the computed results in joint position space to a joint position controller in the next lowest level of the stack. For example, a Cartesian position controller can be given three separate goal states in Cartesian coordinates x, y, and z. For some degrees, the goal state could be a position, while for other degrees, the goal state could be a desired velocity.

These functionalities afforded by the software stack thus provide wide flexibility for control directives to be easily expressed as goal states in a way that meshes naturally with the higher-level planning techniques described above. In other words, when the planning process uses a process definition graph to generate concrete actions to be taken, the actions need not be specified in low-level commands for individual robotic components. Rather, they can be expressed as high-level goals that are accepted by the software stack that get translated through the various levels until finally becoming low-level commands. Moreover, the actions generated through the planning process can be specified in Cartesian space in way that makes them understandable for human operators, which makes debugging and analyzing the schedules easier, faster, and more intuitive. In addition, the actions generated through the planning process need not be tightly coupled to any particular robot model or low-level command format. Instead, the same actions generated during the planning process can actually be executed by different robot models so long as they support the same degrees of freedom and the appropriate control levels have been implemented in the software stack.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program which may also be referred to or described as a program, software, a software application, an app, a module, a software module, a script, or code) can be written in any form of programming language, including compiled or interpreted languages, or declarative or procedural languages, and it can be deployed in any form, including as a stand-alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a data communication network.

For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

As used in this specification, an "engine," or "software engine," refers to a software implemented input/output system that provides an output that is different from the input. An engine can be an encoded block of functionality, such as a library, a platform, a software development kit ("SDK"), or an object. Each engine can be implemented on any appropriate type of computing device, e.g., servers, mobile phones, tablet computers, notebook computers, music players, e-book readers, laptop or desktop computers, PDAs, smart phones, or other stationary or portable devices, that includes one or more processors and computer readable media. Additionally, two or more of the engines may be implemented on the same computing device, or on different computing devices.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and pointing device, e.g., a mouse, trackball, or a presence sensitive display or other surface by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone, running a messaging application, and receiving responsive messages from the user in return.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface, a web browser, or an app through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

In addition to the embodiments described above, the following embodiments are also innovative:

Embodiment 1 is a method comprising:
receiving an initial plan for performing a particular task with a robot having a sensor, wherein the initial plan defines an initial path having a plurality of waypoints, and wherein each waypoint is associated with a target position and a target velocity;
generating an alternative path from the initial path, including:
generating a plurality of alternative paths including performing respective modifications to one or more waypoints in the initial plan,
evaluating each alternative path according to a simulated total time duration required for the robot to traverse the alternative path, and
selecting an alternative path having a total time duration that is less than a total time duration of the initial plan.

Embodiment 2 is the method of embodiment 1, wherein evaluating each alternative path comprises using kinematics parameters of the robot to compute a total time duration for the robot to traverse the alternative path.

Embodiment 3 is the method of any one of embodiments 1-2, wherein the kinematics parameters specify a maximum velocity or a maximum acceleration for the robot.

Embodiment 4 is the method of any one of embodiments 1-3, wherein performing respective modifications to one or more waypoints in the initial plan comprises modifying a respective velocity associated with each waypoint.

Embodiment 5 is the method of any one of embodiments 1-4, wherein each waypoint in the initial plan is associated with a respective acceleration value, and wherein performing respective modifications to one or more waypoints in the initial plan comprises modifying a respective acceleration value associated with each waypoint.

Embodiment 6 is the method of any one of embodiments 1-5, wherein performing respective modifications to one or more waypoints in the initial plan comprises modifying a position of a waypoint and performing an interpolation process to modify a corresponding velocity for the waypoint.

Embodiment 7 is the method of any one of embodiments 1-6, wherein the initial plan is computed offline, and wherein generating the alternative path is performed online.

Embodiment 8 is the method of any one of embodiments 1-7, wherein the initial plan is computed online, and wherein generating the alternative path is performed online.

Embodiment 9 is the method of any one of embodiments 1-8, wherein generating a plurality of alternative paths includes adding one or more new waypoints to the initial plan.

Embodiment 10 is the method of any one of embodiments 1-9, wherein evaluating each alternative path comprises using blending parameters of one or more waypoints to compute a total time duration for the robot to traverse the alternative path.

Embodiment 11 is a system comprising: one or more computers and one or more storage devices storing instructions that are operable, when executed by the one or more computers, to cause the one or more computers to perform the method of any one of embodiments 1 to 10.

Embodiment 12 is a computer storage medium encoded with a computer program, the program comprising instructions that are operable, when executed by data processing apparatus, to cause the data processing apparatus to perform the method of any one of embodiments 1 to 10.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain some cases, multitasking and parallel processing may be advantageous.

What is claimed is:

1. A method performed by one or more computers, the method comprising:
receiving an initial plan for performing a particular task with a robot, wherein the initial plan is computed offline and defines a plurality of initial waypoints defining an initial path from a starting point to an end point, and wherein each initial waypoint is associated with parameters including a target position, a target velocity, and a target acceleration;
providing a first command to the robot to drive the robot to follow the initial path;
after providing the first command to the robot to drive the robot to follow the initial path, generating, during online operation of the robot, an alternative path from the initial path, including:
generating a plurality of alternative paths from the starting point to the end point, including performing respective modifications to at least one of the parameters of one or more initial waypoints in the initial plan to generate alternative waypoints, each alternative path of the plurality of alternative paths comprising a plurality of alternative waypoints,
evaluating each alternative path of the plurality of alternative paths according to a simulated total time duration required for the robot to traverse the alternative path from the starting point to the end point, and
selecting an alternative path having a total time duration that is less than a total time duration of the initial plan; and providing, during online operation of the robot, a second command to the robot to drive the robot to follow one or more alternative waypoints of the selected alternative path instead of the initial path.

2. The method of claim 1, wherein evaluating each alternative path of the plurality of alternative paths comprises using kinematics parameters of the robot to compute a total time duration for the robot to traverse the alternative path, wherein the kinematics parameters specify at least one of a maximum velocity, a maximum acceleration, or a turn radius of the robot.

3. The method of claim 1, wherein performing respective modifications to the at least one of the parameters of the one or more initial waypoints in the initial plan comprises modifying at least one of a respective target velocity or a respective target acceleration associated with each of the one or more initial waypoints.

4. The method of claim 1, wherein performing respective modifications to the at least one of the parameters of the one or more initial waypoints in the initial plan comprises modifying a position of a waypoint and performing an interpolation process to modify a corresponding velocity for the waypoint.

5. The method of claim 1, wherein generating a plurality of alternative paths includes adding one or more new waypoints to the initial plan.

6. The method of claim 1, wherein:
each alternative path of the plurality of alternative paths is associated with one or more respective blending parameters, wherein a blending parameter controls a smoothing interpolation across subsequent segments of the alternative path; and
evaluating each alternative path of the plurality of alternative paths comprises using the one or more respective blending parameters associated with the alternative path to compute a total time duration for the robot to traverse the alternative path.

7. The method of claim 1, wherein the starting point and the end point are each waypoints associated with a target velocity of zero.

8. The method of claim 1, comprising:
receiving data representing limit policies for kinematic parameters of the robot; and
generating the plurality of alternative paths based on the limit policies for the kinematic parameters of the robot.

9. The method of claim 1, wherein each initial waypoint has a sequential position in the initial path, and each alternative waypoint has a same sequential position in the respective alternative path as the initial waypoint from which the alternative waypoint was generated.

10. The method of claim 1, wherein performing respective modifications to the at least one of the parameters of the one or more initial waypoints in the initial plan comprises:
performing a first modification to a first parameter of the initial waypoint; and
after performing the first modification, performing a second modification to a second parameter of the initial waypoint based on an interpolation of the second parameter between a preceding waypoint and a succeeding waypoint.

11. The method of claim 1, wherein generating, during online operation of the robot, the alternative path from the initial path comprises generating the alternative path after the robot initiates travel along the initial path.

12. The method of claim 1, wherein evaluating each alternative path of the plurality of alternative paths according to a simulated total time duration required for the robot to traverse the alternative path from the starting point to the end point comprises:
computing, for a particular alternative path of the plurality of alternative paths, a first time duration of travel of the robot along a first path segment between a first set of two alternative waypoints of the particular alternative path;
computing, for the particular alternative path of the plurality of alternative paths, a second time duration of travel of the robot along a second path segment between a second set of two alternative waypoints of the particular alternative path; and
determining the simulated total time duration required for the robot to traverse the alternative path based on the first time duration of travel along the first path segment and the second time duration of travel along the second path segment.

13. The method of claim 12, comprising:
selecting, for simulation, the first path segment and the second path segment from graph data representing candidate segments of alternative paths.

14. A system comprising one or more computers and one or more storage devices storing instructions that are operable, when executed by the one or more computers, to cause the one or more computers to perform operations comprising:
receiving an initial plan for performing a particular task with a robot, wherein the initial plan is computed offline and defines a plurality of initial waypoints defining an initial path from a starting point to an end point, and wherein each initial waypoint is associated with parameters including a target position, a target velocity, and a target acceleration;
providing a first command to the robot to drive the robot to follow the initial path;
after providing the first command to the robot to drive the robot to follow the initial path, generating, during online operation of the robot, an alternative path from the initial path, including:
generating a plurality of alternative paths from the starting point to the end point, including performing respective modifications to at least one of the parameters of one or more initial waypoints in the initial plan to generate alternative waypoints, each alternative path of the plurality of alternative paths comprising a plurality of alternative waypoints,
evaluating each alternative path of the plurality of alternative paths according to a simulated total time duration required for the robot to traverse the alternative path from the starting point to the end point, and
selecting an alternative path having a total time duration that is less than a total time duration of the initial plan; and
providing, during online operation of the robot, a second command to the robot to drive the robot to follow one or more alternative waypoints of the selected alternative path instead of the initial path.

15. The system of claim 14, wherein evaluating each alternative path comprises using kinematics parameters of the robot to compute a total time duration for the robot to traverse the alternative path, wherein the kinematics parameters specify at least one of a maximum velocity, a maximum acceleration, or a turn radius of the robot.

16. The system of claim 14, wherein performing respective modifications to the at least one of the parameters of the one or more initial waypoints in the initial plan comprises modifying at least one of a respective target velocity or a respective target acceleration associated with each of the one or more initial waypoints.

17. The system of claim 14, wherein performing respective modifications to the at least one of the parameters of the one or more initial waypoints in the initial plan comprises modifying a position of a waypoint and performing an interpolation process to modify a corresponding velocity for the waypoint.

18. A non-transitory computer storage medium encoded with instructions that, when executed by one or more computers, cause the one or more computers to perform operations comprising:

receiving an initial plan for performing a particular task with a robot, wherein the initial plan is computed offline and defines a plurality of initial waypoints defining an initial path from a starting point to an end point, and wherein each initial waypoint is associated with parameters including a target position, a target velocity, and a target acceleration;

providing a first command to the robot to drive the robot to follow the initial path;

after providing the first command to the robot to drive the robot to follow the initial path, generating, during online operation of the robot, an alternative path from the initial path, including:

generating a plurality of alternative paths from the starting point to the end point, including performing respective modifications to at least one of the parameters of one or more initial waypoints in the initial plan to generate alternative waypoints, each alternative path of the plurality of alternative paths comprising a plurality of alternative waypoints, evaluating each alternative path of the plurality of alternative paths according to a simulated total time duration required for the robot to traverse the alternative path from the starting point to the end point, and selecting an alternative path having a total time duration that is less than a total time duration of the initial plan; and providing, during online operation of the robot a second command to the robot to drive the robot to follow one or more alternative waypoints of the selected alternative path instead of the initial path.

\* \* \* \* \*